(12) United States Patent
Lochmann et al.

(10) Patent No.: US 10,960,731 B2
(45) Date of Patent: Mar. 30, 2021

(54) HEATING ELEMENT FOR USER-TOUCHABLE AREAS IN A VEHICLE AND METHOD FOR PRODUCING SUCH A HEATING ELEMENT

(71) Applicant: I.G. BAUERHIN GMBH, Gruendau (DE)

(72) Inventors: Karl Lochmann, Gruendau (DE); Volker Prescher, Kahl (DE)

(73) Assignee: I. G. BAUERHIN GMBH, Gruendau (DE)

( * ) Notice: Subject to any disclaimer, the term of this patent is extended or adjusted under 35 U.S.C. 154(b) by 255 days.

(21) Appl. No.: 16/127,282

(22) Filed: Sep. 11, 2018

(65) Prior Publication Data

US 2019/0077220 A1    Mar. 14, 2019

(30) Foreign Application Priority Data

Sep. 11, 2017  (DE) .................... 10 2017 008 496.3

(51) Int. Cl.
  B60H 1/22    (2006.01)
  B60N 2/56    (2006.01)
  (Continued)

(52) U.S. Cl.
  CPC ........... B60H 1/2215 (2013.01); B29C 44/12 (2013.01); B60H 1/2227 (2019.05); B60N 2/5685 (2013.01); B60N 2/6009 (2013.01); H05B 3/18 (2013.01); H05B 3/36 (2013.01); *B23K 11/002* (2013.01); *B23K 11/0026* (2013.01); *B29C 44/351* (2013.01); *B29C 44/58* (2013.01);

(Continued)

(58) Field of Classification Search
  None
  See application file for complete search history.

(56) References Cited

U.S. PATENT DOCUMENTS 2,427,756 A * 9/1947 West ..................... B21D 51/12
                                          29/874
2,478,082 A * 8/1949 Broske .................... H01R 4/20
                                         174/84 C (Continued)

FOREIGN PATENT DOCUMENTS

DE         3725408 A1      7/1987
DE       10159814 A1 *     6/2003    ............ B60R 13/02

*Primary Examiner* — Joseph M. Pelham
(74) *Attorney, Agent, or Firm* — Robert W. Morris; Eckert Seamans Cherin & Mellott, LLC

(57) ABSTRACT

Heating element for user-touchable areas in a vehicle with a foamed carrier material in which at least one heating conductor, which comprises an electrical insulation, is embedded, and with connecting conductors which are electrically connected to the ends of the heating conductor via at least one connection part and form an electrical feed line. The at least one connection part is arranged within the foamed carrier material and the connection part is foam-covered in an electrically insulating manner by the carrier material. The connection part is brought into electrically conductive contact at least partially with the respective connection end of the heating conductor due to applied pressure and/or applied heat, at least partially destroying the electrical insulation in the region of the connection part. Furthermore, a method for producing such a heating element using a mold tool is indicated.

7 Claims, 4 Drawing Sheets

(51) Int. Cl.
    *B60N 2/60*         (2006.01)
    *H05B 3/18*         (2006.01)
    *H05B 3/36*         (2006.01)
    *B23K 11/00*        (2006.01)
    *B23K 11/36*        (2006.01)
    *B29C 44/12*        (2006.01)
    *B29C 44/58*        (2006.01)
    *B29C 44/34*        (2006.01)
    *H05B 3/28*        (2006.01)
    *H05B 3/34*        (2006.01)

(52) U.S. Cl.
    CPC ...... *B29K 2995/0005* (2013.01); *H05B 3/286* (2013.01); *H05B 3/34* (2013.01); *H05B 2203/016* (2013.01)

(56) References Cited

U.S. PATENT DOCUMENTS

| | | | | |
|---|---|---|---|---|
| 2,882,333 | A * | 4/1959 | Bertaux | H02G 15/10 174/90 |
| 2,978,565 | A * | 4/1961 | Sullivan | H02G 1/1275 81/9.44 |
| 3,231,964 | A * | 2/1966 | Bennett | H01R 4/18 29/873 |
| 4,034,152 | A * | 7/1977 | Warner | H01R 4/026 174/94 R |
| 4,396,819 | A * | 8/1983 | Muchkin | B23K 1/0004 219/91.21 |
| 4,571,019 | A * | 2/1986 | Arai | B23K 11/163 24/129 B |
| 4,964,674 | A * | 10/1990 | Altmann | A47C 7/748 219/217 |
| 5,278,354 | A * | 1/1994 | Lhomme | H01R 4/72 174/84 C |
| 5,342,996 | A * | 8/1994 | Ito | H01R 4/184 174/84 C |
| 5,393,932 | A * | 2/1995 | Young | H01Q 1/244 174/84 R |
| 6,489,595 | B1 * | 12/2002 | Check | B29C 65/02 219/202 |
| 6,658,735 | B2 * | 12/2003 | Ito | H01R 4/183 174/84 C |
| 6,710,303 | B1 * | 3/2004 | Lorenzen | H05B 3/34 174/84 R |
| 6,976,889 | B2 * | 12/2005 | Kuwayama | H01R 4/188 29/862 |
| 7,823,967 | B2 * | 11/2010 | Parnis | B64D 11/0647 297/180.12 |
| 8,353,104 | B2 * | 1/2013 | Chen | B21D 39/048 29/862 |
| 2002/0170902 | A1 * | 11/2002 | Check | B29C 66/69 219/217 |
| 2003/0080455 | A1 | 5/2003 | Kreuzer | |
| 2004/0094534 | A1 * | 5/2004 | Howick | H05B 3/56 219/529 |
| 2008/0093890 | A1 | 4/2008 | Mehling et al. | |
| 2010/0258334 | A1 * | 10/2010 | Akaike | H05B 3/347 174/126.1 |
| 2015/0096803 | A1 * | 4/2015 | Pope | H02G 1/16 174/84 R |
| 2015/0239379 | A1 * | 8/2015 | Yoshida | A47C 7/748 297/180.12 |
| 2015/0291001 | A1 | 10/2015 | Thalhammer | |
| 2015/0366367 | A1 * | 12/2015 | Augustine | A61F 7/08 219/212 |
| 2016/0243352 | A1 * | 8/2016 | Raines | B23K 11/004 |
| 2020/0137838 | A1 * | 4/2020 | Wada | H05B 3/36 |

* cited by examiner

HEATING ELEMENT FOR USER-TOUCHABLE AREAS IN A VEHICLE AND METHOD FOR PRODUCING SUCH A HEATING ELEMENT

CROSS REFERENCE TO RELATED APPLICATIONS

This application corresponds to German Patent Application No. 10 2017 008 496.3, filed on Sep. 11, 2017, the disclosure of which is incorporated herein by reference.

BACKGROUND OF THE INVENTION

The present invention refers to a heating element for user-touchable areas in a vehicle and a method for producing such a heating element.

Such heating elements are used for seat heaters, steering wheel heaters, but also for paneling parts in a vehicle. In their basic structure, they comprise a foamed carrier material in which at least one heating conductor is embedded, which comprises electrical insulation and which extends straight, preferably undulating or meandering. The ends of the heating conductor are led out of the carrier material and form connections for an electrical connection or are connected to connecting conductors as an electrical feed line.

These heating elements are usually made of two layers of foam between which the heating conductor is embedded. In order to fix the heating conductor according to a required laying pattern, it is first fastened on a carrier or in any other way to at least one of the two foam layers.

DE 10 2014 005 190 A1 (corresponds to US 2015/291001 A1) is aimed at a method for producing an inner paneling part with a visible side and a planar heating element. The heating element is inserted into a mold cavity of a mold tool and foam-covered with a foam material.

WO 2006/015588 A1 (corresponds to US 2008/093890 A1) describes a component with a rigid foam body and an electrical and/or electronic functional element foam-encased therein, for example a light means or a heating device that can have the form of a foil heater, or a sensor. The corresponding functional element is electrically connected within the rigid foam body via an at least partially foam-encased flat conductor set which ends in a plug. The plug can be foam-encased at the edge of the rigid foam body so that the plug contacts are accessible for electrical connection.

DE 37 25 408 A1 refers to a heatable laid-on cover for a vehicle seat, in which an electric heating conductor is embedded in a foam laid-on cover. The cover can consist of a two-part foam body in which the heating conductor is inserted and/or held in a form-fitting manner, the two foam halves being glued together. The heating conductor can also be foam-encased in a foam.

DE 101 52 719 C1 (corresponds to US 2003/080455 A1) describes a process for foam-encasing cables, in particular for foam-covering a steering wheel skeleton equipped with cables. The mold tool has a cavity into which the ends of the electrical cables and a plug fastened thereto, which are used, for example, to connect a steering wheel heater, are inserted so that the connecting cable with the plug does not come into contact with foam when the steering wheel skeleton is foam-covered.

SUMMARY OF THE INVENTION

It is the object of the present invention to indicate a heating element suitable for user-touchable areas in a vehicle and a method for producing such a heating element which has a simple structure, in particular with respect to the connection of the heating element provided with an insulation, and which is easy to produce, and to eliminate the palpability of the heating conductor and the connection on the user-facing side of an object to be heated, as well as to indicate a method for producing such a heating element.

This object is achieved by a heating element and a method according to the invention.

The heating element, which is suitable for user-touchable areas in a vehicle, has a foamed carrier material in which at least one heating conductor is embedded, which comprises an electrical insulation.

User-touchable areas include interior paneling parts, seat areas, vehicle steering wheel, glove compartment door, gear knob or gear selector lever.

An essential feature of the heating element according to the invention is that the at least one connection part, which forms the electrical connection of the ends of the heating conductor with electrical feed lines or connection lines, is arranged inside the foamed carrier material, whereby the connection part is foam-covered in an electrically insulating manner by the carrier material. Another essential feature is that the connection part is at least partially connected to the respective connection end of the heating conductor due to an applied pressure and/or heat, whereby the electrical insulation in the region of the connection part is at least partially destroyed. This provides an electrically conductive contact between the connection end of the heating conductor and the electrical feed line (connecting conductor), although the heating conductor is also provided with the insulation at its connection end.

The electrical connection between the insulation-provided heating conductor and the connecting conductor is thus established by a mechanical and/or heat-generating process in which the insulation of the heating conductor at its end, which is assigned to the connection point with the connecting conductor, is at least partially destroyed. This process, which at least partially destroys the insulation in the region of the connection point, is based on the application of pressure and/or heat.

The connection part is arranged inside the foamed carrier material and is therefore completely foam-covered. This keeps the connection part and the connection between heating conductor and feed line securely inside the foam material and insulated and protected by the foam material.

According to the method, at least one heating conductor is embedded in a foamed carrier material to produce a heating element for user-touchable areas in a vehicle. The connecting conductors, which form an electrical feed line, are electrically connected via at least one connection part to the ends of the heating conductor, which has electrical insulation. The at least one connection part is arranged inside the foamed carrier material and thus foam-covered in an electrically insulating manner by the carrier material. The connection part is at least partially connected to the respective connection end of the heating conductor by a pressure applied thereto and/or a heat applied thereto, whereby the electrical insulation in the region of the connection part is at least partially destroyed and brought into electrically conductive contact with the connection part. An essential aspect of the method according to the invention is that an electrically insulated heating conductor can be used for producing the heating element and it is not necessary to strip the connection ends of this electrically insulated heating conductor in order to establish electrical contact with the connections, which usually represents a labor-intensive process. The entire method can thereby be carried out in an automated and continuous manner, without interruption by a further intervention for stripping the ends of the heating conductor.

A mold tool is provided for producing a heating element as described above. The at least one heating conductor is inserted into the cavity of the mold tool according to a predetermined laying pattern, extending straight, preferably undulating or meandering. The heating conductor can be fastened, held and/or fixed in the cavity according to the laying pattern. The respective end of the heating conductor and the end of the connecting conductor assigned to this end are arranged inside the mold tool and fixed via a connection part.

The cavity is then filled with a foam-forming material that foams up under heat or also with a reactant so that the cavity of the mold tool is filled with foam. The heating conductor, the connection part and also the feed lines connected thereto are thereby foam-covered. The heating element can subsequently be removed from the mold tool. Preferably, a two-component foam material is used.

Preferably, the heating conductor is guided around and/or over/on pins in the cavity of the mold tool, which then lead to voids or through holes in the foamed carrier material of the heating element when the heating element is removed from the mold tool. The size, the type, the shape of these voids or through holes can be influenced by a corresponding shape and length of the pins, regardless of the function of the pins as guide elements, in order to lay and/or fix the heating conductor in the cavity before the injection or filling or the foaming or spraying process. The heating conductor, or also a plurality of heating conductors, can be laid in an automated manner.

Consequently, the pins hold the heating conductor in a position so that, after the foam-filling of the cavity, it is in a plane that ensures that it is foam-encased in the foam material on both sides and surrounded by the foam material. It is also provided that, if necessary, the feed lines leading to the connection part are also held in a predetermined position by such pins. The distance between heating conductor and top side of the foamed carrier material or the distance between heating conductor and bottom side of the foamed carrier material can vary.

In order to hold the heating conductor in a certain position in relation to the length of the pins during laying, notches or supports/steps/levels are provided on the pins in which the heating conductor is inserted or rests and is secured against slipping.

When manufacturing the heating element, a temperature detection element, preferably an NTC sensor (Negative Temperature Coefficient—thermocouple), can be inserted into the cavity of the mold tool and foam-covered. The connection ends thereof can also be connected to feed lines via one or more corresponding connection parts, for example crimp(s), as described above with respect to the heating conductor, whereby this/these crimp(s) is/are also embedded in the foam material during foam-filling of the cavity.

A closed-pore or open-pored foam can be formed in the cavity, with an open-pored foam being preferred. The foam or foam material is injected into the mold tool preferably without pressure in order not to influence the position of the at least one heating conductor.

To connect the heating element to a surface to be heated, a preferred measure is to insert fasteners into the mold tool which are assigned to a surface of the heating element and bond to the foam material when the cavity is foam-filled. After removing the heating element from the mold tool, these fasteners are then located on the surface of the carrier material of foam. The fasteners can be an adhesive tape or part of a Velcro tape, preferably a fleece tape.

Fasteners can be inserted into the mold tool which are assigned to a surface of the heating element and combine with the foam material during foam-filling of the cavity. These fasteners can then be used to fasten the heating element to or in a user-touchable area in a vehicle, for example a seat or steering wheel rim, or the like.

In order to stabilize the heating element in its haptics, one possible measure is to insert stabilizers inside the mold tool that bond to the foam material when the cavity is filled with foam. After removal of the heating element from the mold tool, the stabilizers are then located inside the carrier material of foam. The stabilizers can, for example, be made of textile material. By means of the stabilizers the deformability and the haptics are adjustable.

To design the surface, the user-touchable area, such as a cover or door panel, etc., can also be inserted into the mold tool. This means that no additional fastening means, such as adhesives, are required. The area to be heated and the foamed heating element are so to speak designed in one piece.

Pressure welding, resistance welding or friction welding can be used to make the connection between heating conductor, feed line and/or connection part by applying pressure and heat.

A crimp connection part that can be mechanically deformed to fix the end of the heating conductor and/or the end of the feed line with this crimp part can preferably be used as the connection part, before additional heat and/or pressure are then applied to at least partially destroy the insulation at the end of the heating conductor.

A metal part is provided as connection part. However, in special cases, a circuit board with connection surfaces can be used as a connection part. In this case, too, a pressure or heat-generating process fixes the end of the heating conductor to the connection surface in order to remove the insulation at the end of the heating conductor and establish electrical contact with the connection surface.

With the connection part, the end of the heating conductor and the end of the assigned electrical feed line are overlappingly seized. In an alternative embodiment, a connection part can be used in which the heating conductor is connected at its one end and the electrical feed line is connected at its other end.

With the method according to the invention, a heating element is produced in one operation, in which the heating conductor provided with an electrical insulation is connected to the feed lines without the heating conductor having to be stripped in the region of the connection point. The insulation is removed or at least partially destroyed solely by the heat and/or pressure exerted when connecting the heating conductor via the connection part to the feed line. Since the end of the heating conductor, the connection part and the end of the feed line are positioned within the carrier material, this region is also foam-encased in the carrier material when the carrier material is produced, so that the connection region between heating conductor and feed line is surrounded by an insulating layer, namely the carrier material, without further measures.

Another essential feature of the heating element according to the invention is that no carrier is required for positioning and fixing the heating conductor according to a required laying pattern.

Further details and features of the invention become apparent from the following description of embodiments based on the drawing.

BRIEF DESCRIPTION OF THE DRAWINGS

In the drawing, FIGS. 1 to 6 show the process sequence for the production of a heating element according to the invention, wherein FIG. 1 is a perspective top view on a cutout of the lower part of a mold tool;

FIG. 2 is a view of the mold tool according to FIG. 1 with heating conductor, temperature detection element and connection wires laid therein during the phase when connection parts are attached for connecting the connection wires to the connection ends of the heating conductor;

FIG. 3 shows the phase of the method during which pressure and/or heat is applied to the connection part with the heating conductor and the associated connection wires;

FIG. 4 is a view according to FIG. 3, after the connection process according to FIG. 3 has been completed;

FIG. 5 shows the mold tool in which the cavity is covered by an upper part fill the cavity with foam;

FIG. 6 shows the heating element removed from the mold tool;

DESCRIPTION OF THE PREFERRED EMBODIMENT

Figure 1:
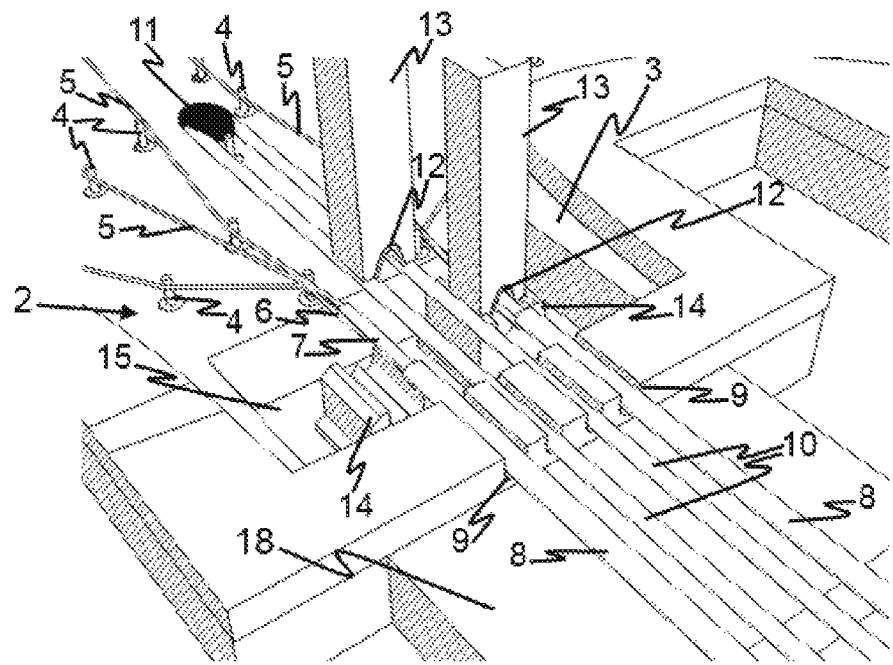

The heating element according to the invention is produced using a mold tool which preferably consists of two mold parts, with only a partial area of the lower mold part 1, which has a void or a cavity 2, being shown in FIG. 1.

On a bottom surface 3 of mold part 1, there are many pins 4 which extend with their axis perpendicular to the bottom surface 3 of the mold part 1. The pins 4 are positioned according to a given course of a heating conductor, so that the heating conductor, when it is guided around the pins, extends according to a pattern, for example straight, undulating or meandering.

Figure 2:
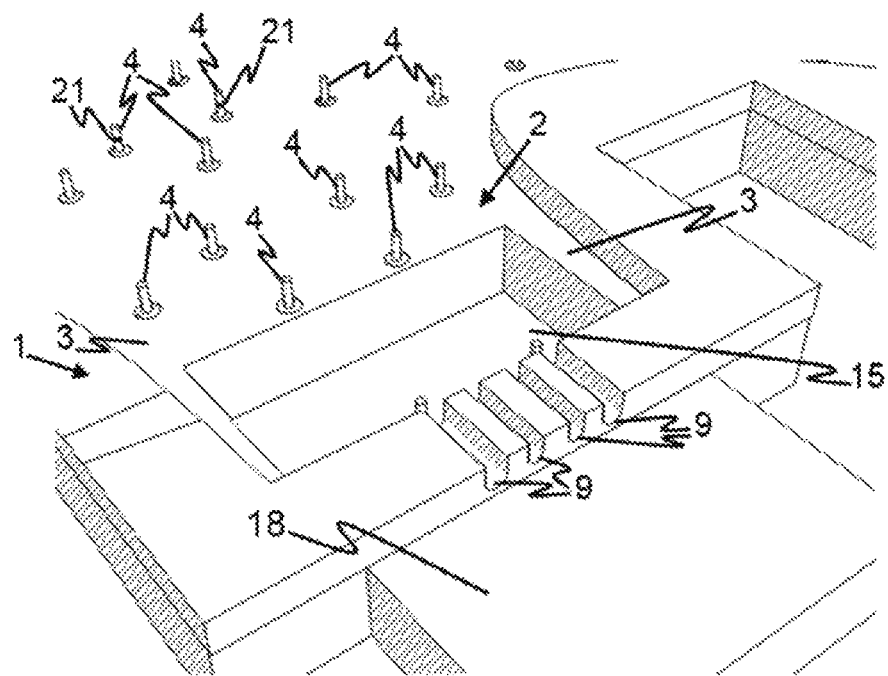

As FIG. 2 shows, the heating conductor, designated by reference numeral 5, is divided into several sections, each of which forms a heating conductor circuit. The heating conductor 5 is provided with insulation not shown in detail. The respective one ends 6 of the sections and the respective other ends 6 of the sections are joined in such a way that the respective connection ends can be connected together with the stripped end 7 of a respective connection wire or connecting conductor 8. The ends 6 of the respective heating conductor circuit can be connected to each other if the individual heating conductor circuits are formed, for example, by an endlessly laid heating conductor 5.

In the edge region of the mold part 1 there are four grooves 9 in the mold tool shown. One of the two connection wires 8 is inserted into each of the two outer grooves 9 in such a way that the stripped end 7 of the connection wire 8 is inside the cavity 2.

The ends 6 of the heating conductor 5, which are still provided with insulation, and the end 7 of the respective connection wire 8 are dimensioned in their length in such a way that they overlap each other or lie parallel to each other.

In the embodiment shown, the connection lines 10 of a temperature detection element 11 are inserted in the two middle grooves 9, the temperature detection element being positioned between the heating conductors 5 for temperature detection.

For an electrical connection of the one ends or the other ends of the heating conductor 5 with the respective connection wire 8, a connection part 12 is used. This connection part 12 is a connector with an essentially C- or U-shaped cross-section. To attach this connection part 12 to the connection point between the ends 6 of the heating conductor 5 and the ends 7 of the respective connection wire 8, it is first positioned, for example removed from a magazine, at the end of an upper crimping tool 13, as shown in FIG. 2. The respective, stamp-shaped crimping tool 13 then places the connection part 12 on the connection point. The crimping tool 13 is supported on the opposite side by a counter bearing 14, which forms the lower part of the crimping tool, which can be moved upwards from the underside of the mold part 1 out of an opening 15 formed therein. Subsequently, the connection part 12 is pressed onto the end 7 of the connection wire 8 and the ends 6 of the heating conductor 5 by the interaction of the upper crimping tool 13 and the counter bearing 14, as shown with reference to the crimping tool 13, 14 at the right side in FIG. 2. While the end 7 of the connection wire 8 has already been stripped, the respective end 6 of the heating conductor 5 is still provided with its insulation.

Figure 3:
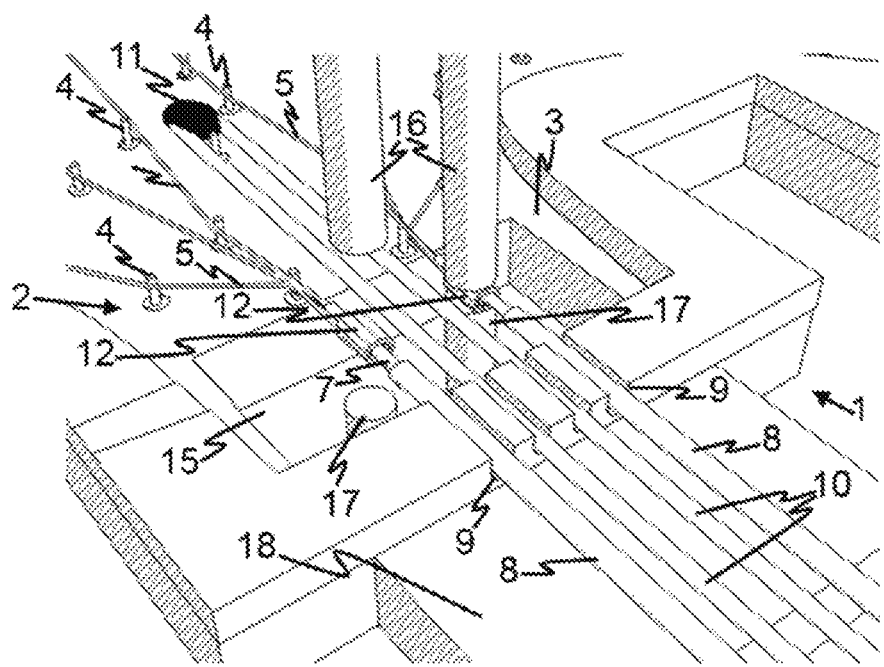

Subsequently, the crimping tool 13, 14 is detached from the connection part 12. Instead of the upper crimping tool 13 and the lower crimping tool 14, namely the counter bearing 14, upper and lower electrodes 16, 17 are then placed, as shown in FIG. 3, on the connection parts 12 connected to the ends 6, 7 of the heating conductor 5 and the connection wire 8 to apply pressure and/or heat to the respective connection part 12, thereby obtaining an electrical connection between heating conductor 5 and connection wire 8. The applied pressure, and in particular the applied heat, at least partially destroys the insulation that was previously located on the end 6 of the heating conductor 5, so that an electrical connection is obtained between the ends 6, 7. This eliminates a labor-intensive process of stripping the end of the heating conductor 5.

For this process, as shown in FIG. 3, pressure welding, resistance friction welding or ultrasonic welding can be used.

Figure 4:
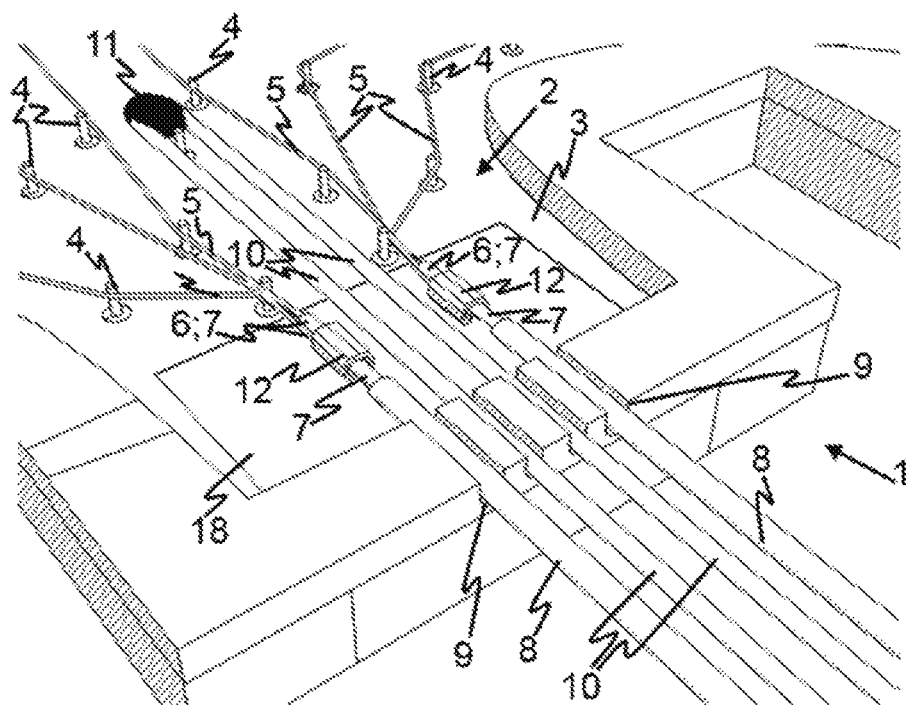
Figure 5:
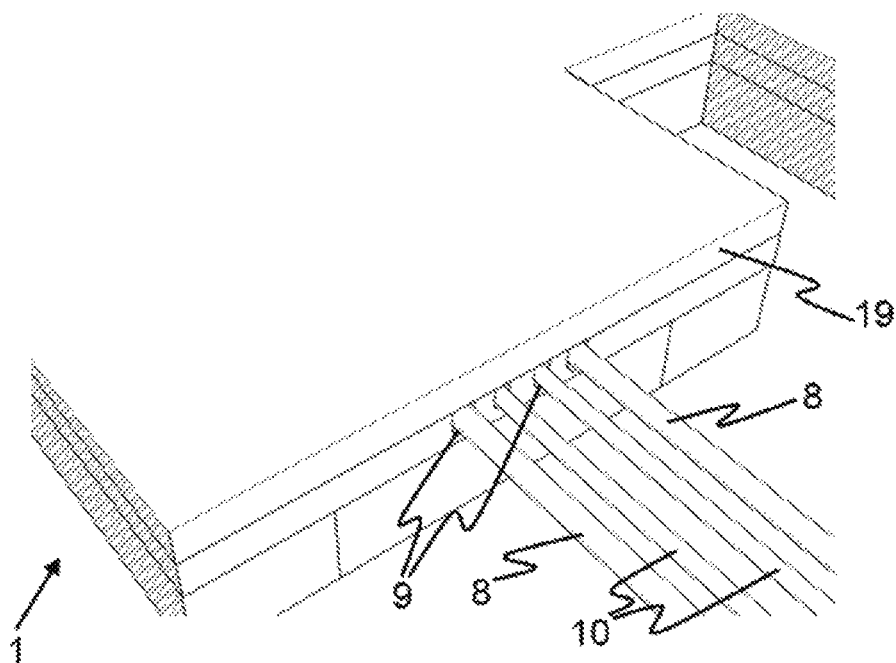

Now the electrodes 16, 17 are removed and the opening 15, which is located in the bottom surface 3 of the lower mold part 1, is closed by a closing plate 18, as shown in FIG. 4.

Subsequently, the lower mold part 1 is covered by an upper mold part 19 so that the cavity 2 is closed to then fill the cavity 2 with a foam and to foam-fill it so that, in addition to the heating conductor 5, the connection part 12, which surrounds the ends 6, 7 of the heating conductor 5 and the connection wires 8, is also foam-covered. The foam filling agent can also be introduced into the cavity 2 before the upper mold part 19 is mounted.

Figure 6:
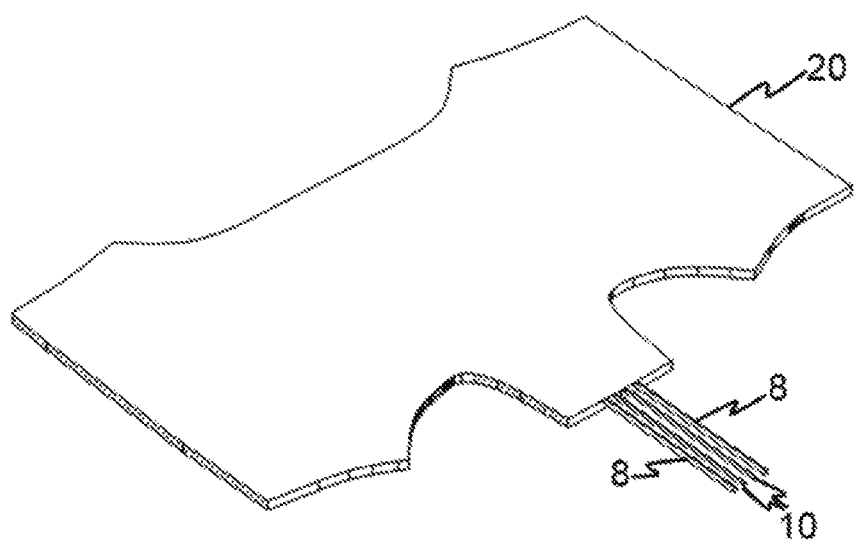

After foaming, the heating element 20, as shown in FIG. 6, can be removed.

While first a crimping tool 13; 14 is used on the basis of FIGS. 2 and 3 to attach the connection part 12, and subsequently a welding process is carried out via the electrodes 16, 17, it is also provided that the crimping tools 13, 14 additionally assume the function of the electrodes 16, 17 in that the crimping tools 13, 14 additionally weld and/or press the connection ends to the connection part 12 after the connection part 12 has been attached.

It should be noted that the pins 4, which serve to lay the heating conductor 5 according to a certain pattern, can also be attached to a plate-shaped upper mold part 19, just as the connection process can be assigned to this upper mold part 19 by means of the connection part 12.

The pins 4 may have a notch 21 or a shoulder/support, indicated on two of the pins 4 in FIG. 1, in which the heating conductor 5 rests so that it is held at a predetermined height above the bottom surface 3 of the mold part 1.

Furthermore, fasteners (not shown in more detail) which are assigned to a surface of the heating element 20 and connect with the foam material during foam-filling of the cavity 2 can be inserted into the mold tool 1, 19. These fasteners are used to fasten the heating element, for example, in a vehicle seat or to a steering wheel rim.

Figure 7A:
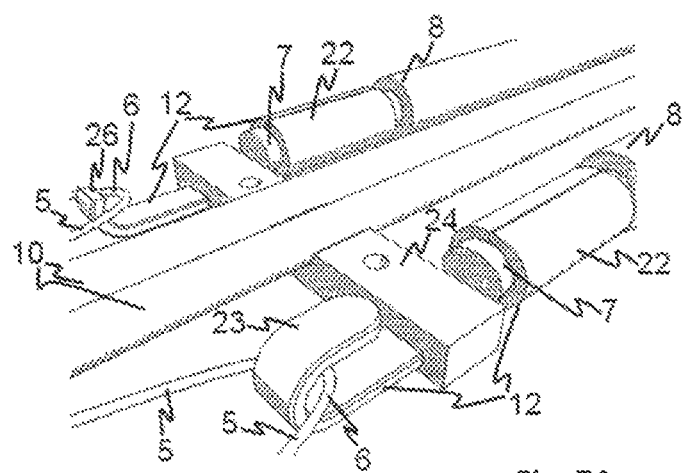
FIG. 7a shows a further design variant of a connection part for connecting the ends of the heating element to the connection wires, which can be inserted into the mold tool described with reference to FIGS. 1 to 3.
Figure 7B:
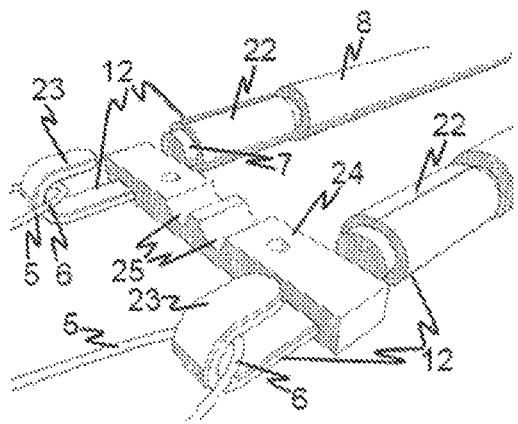
FIG. 7b is a view comparable to that of FIG. 7a, in which the connection lines of a temperature detection element are additionally shown and with an additional embodiment for the connection of the end of the heating conductor to the connection part.
Figure 8:
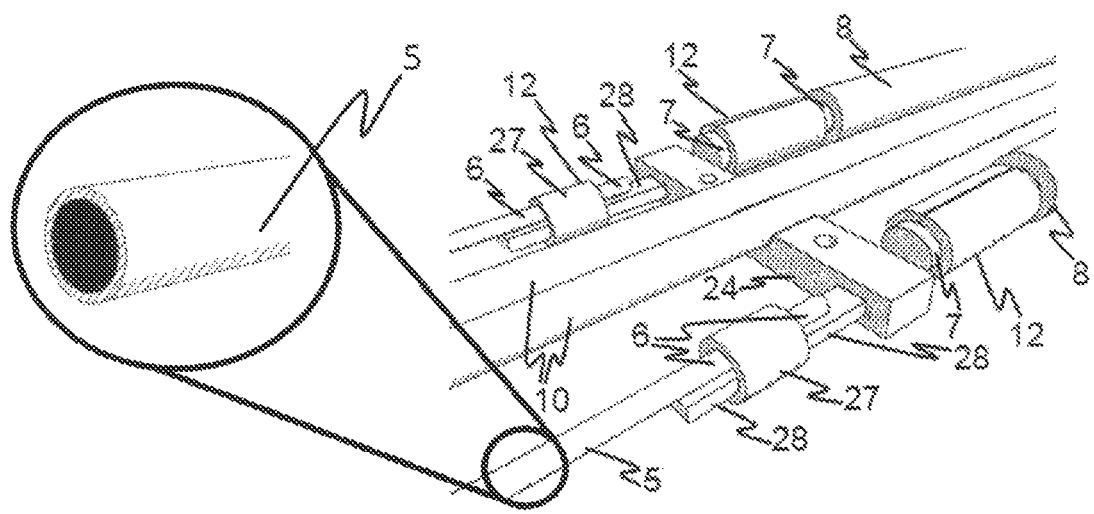
FIG. 8 is a view comparable to that of FIG. 7b with an additional embodiment for the connection of the end of the heating conductor to the connection part.

FIGS. 7a, 7b and 8 show further embodiments of connection parts 12. In these embodiments the end 6 of the heating conductor 5 is fastened to the one end of the connection part 12, while the end 7 of the connection wire or connecting conductor 8, which forms the feed line for the heating element, is fastened to the other end of the connection part 12. For this purpose the corresponding end of the connection part 12 comprises a crimp connector 22 which is pressed/crimped onto the stripped end of the connection wire 8. The corresponding other end of the connection part 12 is configured in the form of a hook 23 into which the end 6 of the heating conductor 5 is inserted. The two connection parts 12 are held in a holding bridge 24 which can be fastened to or in the lower mold part 1 of the mold tool. To connect the end 6 of the heating conductor 5 with the hook 23, the end 6 of the heating conductor 5 is laid around the hook, the hook 23 is then compressed, for instance by using an upper crimping tool 12 and the counter bearing 14, as are shown in FIG. 2, or by using the upper electrode 16 and the lower electrode 17, as are shown in FIG. 3, and the insulation on the end 6 of the heating conductor 5 is at least partially destroyed by the generated pressure and/or corresponding heat, for example by a welding process, so that the electrical contact is established.

The holding bridge 24 comprises two additional grooves 25 between the two connection parts 12 into which the connection lines 10 of a temperature detection element 11, which is also shown in FIGS. 2 to 4, can be inserted and held.

FIG. 7b shows a further embodiment of the hook 23, as shown in the embodiment of FIG. 7a, replaced by an only upwardly bent hook part 25. In a connection part 12 configured in this way the end 6 of the heating conductor 5 is only welded to achieve both a mechanical and electrical connection.

In the embodiment of FIG. 8, as compared with the embodiment as shown in FIG. 7a or 7b, the hook 23 or the hook part 25 is replaced by a further crimp holder 27 which is comparable with that shown in FIG. 2. With this further crimp holder 27 the end 6 of the heating conductor 5 is connected at a connection web 28 as part of the connection part 12 by a crimp process, according to the connection process, as shown with reference to FIGS. 2 to 4.

It is evident that the production process of the heating element 20 can be carried out in a fully automated way and that in this process the connection wires 8 for the heating element 20 and the connection lines 10 for the temperature detection element 11, if such an element is used, can be integrated into the foamed carrier material of the heating element 20 at the same time. Another advantage is that the heating conductor 5 can be integrated in any laying patterns into the foamed carrier material, without a carrier being needed for this purpose, to fix the heating conductor 5 according to a laying pattern thereto before foaming.

The invention claimed is:

1. Heating element for user-touchable areas in a vehicle with a foamed carrier material in which at least one heating conductor, which comprises an electrical insulation, is embedded without a carrier being needed for fixing the heating conductor, and with connecting conductors which are electrically connected to the ends of the heating conductor via at least one connection part and which form an electrical feed line, wherein the at least one connection part is arranged within the foamed carrier material and the connection part is foam-covered in an electrically insulating manner by the foamed carrier material, wherein the connection part is brought into electrically conductive contact at least partially with a respective connection end of the heating conductor due to at least one of applied pressure and applied heat, thereby at least partially destroying the electrical insulation in the region of the connection part.

2. Heating element according to claim 1, wherein the respective end of the heating conductor is connected by pressure welding to the electrical feed line via the connection part.

3. Heating element according to claim 1, wherein the connection part is a crimp connection part.

4. Heating element according to claim 1, wherein the connection part is a metal part.

5. Heating element according to claim 1, wherein the connection part overlappingly seizes the end of the heating conductor and the end of the associated electrical feed line.

6. Heating element according to claim 1, wherein the connection part is connected at its one end to the heating conductor and at its other end to the electrical feed line.

7. Method for producing a heating element for user-touchable areas in a vehicle, in which at least one heating conductor is embedded in a foamed carrier material wherein at least a two-part mold tool with a cavity is provided, the at least one heating conductor is inserted according to a predetermined laying pattern into the cavity of the mold tool guided around pins wherein the pins are part of the mold tool, wherein a respective end of the heating conductor and a respective end of a connecting conductor assigned to said end which form an electrical feed line as well as the connection part which comprises an electrical insulation, is brought into electrically conductive contact at least partially by at least one of pressure applied thereto and heat applied thereto, whereby the electrical insulation is at least partially destroyed in the region of the connection part, and wherein the mold tool is closed, and wherein the cavity of the mold tool is then filled with a foam-forming material that reacts and forms a foam, such that the cavity is foam-filled and both the heating conductor and the at least one connection part are foam-covered in an electrically insulating manner, and removal of the heating element from the mold tool.

* * * * *